April 13, 1971     M. BASCHE     3,574,665
PROCESS FOR COATING FILAMENTS WITH A RESIN
Filed Aug. 12, 1968
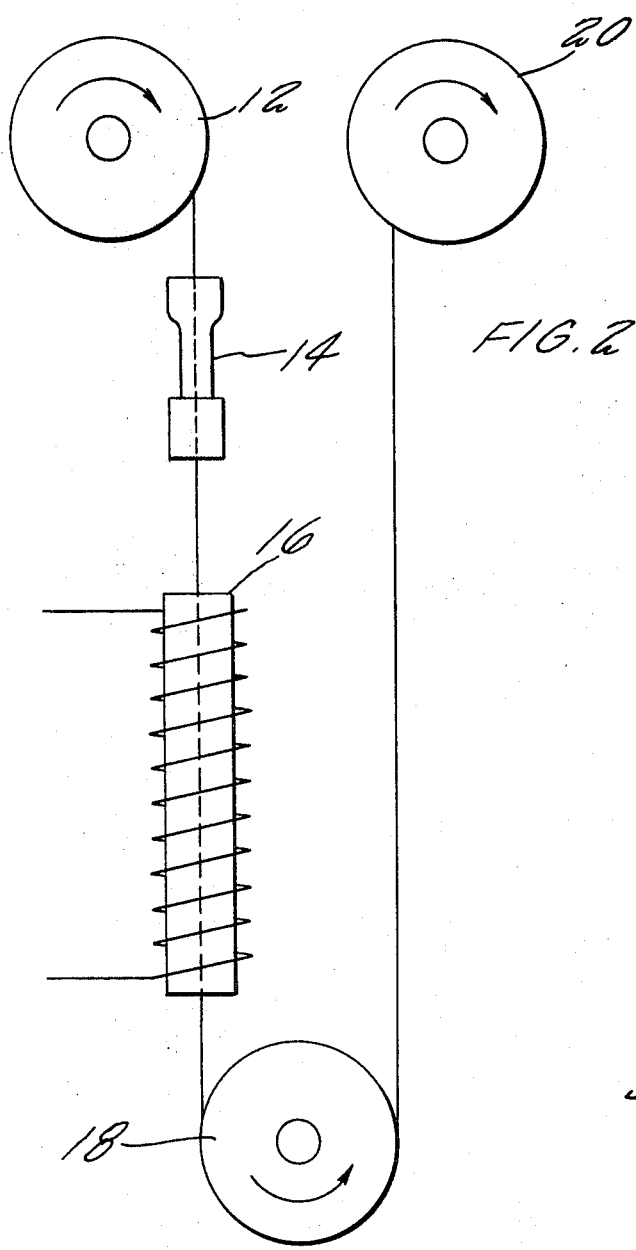
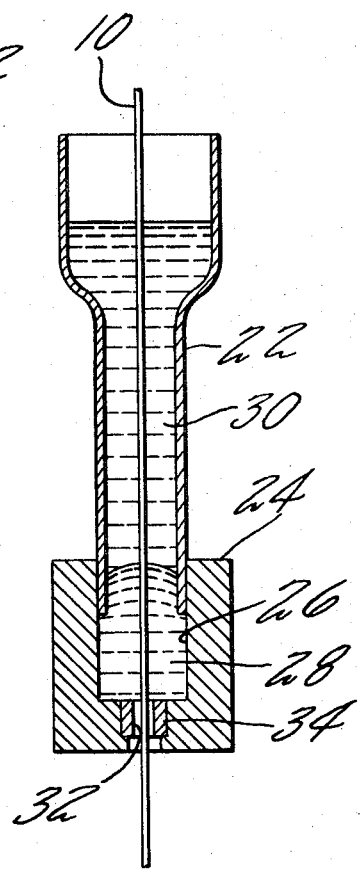
INVENTOR
MALCOLM BASCHE
BY    *John J. Sullivan*
           ATTORNEY

United States Patent Office 3,574,665
Patented Apr. 13, 1971

3,574,665
PROCESS FOR COATING FILAMENTS
WITH A RESIN
Malcolm Basche, West Hartford, Conn., assignor to
United Aircraft Corporation, East Hartford, Conn.
Filed Aug. 12, 1968, Ser. No. 752,080
Int. Cl. B05c 3/12, 11/02; B44d 1/06
U.S. Cl. 117—64
4 Claims

ABSTRACT OF THE DISCLOSURE

A process for providing a moving substrate with a smooth and uniform overcoat of resin by passing a filament successively through a liquid resin and liquid mercury, the mercury acting both as a wiper and as a supporting sealant for the resin.

BACKGROUND OF THE INVENTION

It is known that filamentary boron may be produced by pyrolytic techniques wherein the boron is deposited on a resistively heated wire which is drawn through a gaseous reactant stream consisting of boron trichloride admixed with hydrogen.

Early investigations quickly revealed the potential utility of these fibers in the production of fiber-reinforced articles having improved physical properties. In order to exploit the high strength properties of the filamentary materials, however, it is necessary to gather the fibers together in such a way that the load imposed thereon is distributed over the entire fiber bundle. One method of effecting this result is to form a tape by encasing the fibers in a parallel precisely spaced relation in a matrix material which will deform pastically. The tape can then be wound or otherwise manipulated to form a desired structure.

One of the paramount problems in obtaining high strength, high modulus fiber-reinforced articles involves the actual incorporation of the fibers into the matrix material to provide the desired end product. There are basically two ways in which filaments may be incorporated into a matrix in a parallel, uniformly spaced fashion. One way is to precision align the filaments prior to encasement and control their spacing by tension means until the matrix material is applied. The problem inherent in this procedure is that the extremely small dimensions of the filaments and the desired precisely uniform spacings between them result in tolerances which are too small to permit economically feasible production on a commercial scale. The other general method involves precoating each individual substrate with a material so that the fibers can subsequently be aligned in side-by-side relation without any substrate-to-substrate contact. Unfortunately, this procedure relies for its spacing accuracy on a comprehensive uniformity of the pre-coating throughout the length of each filament. Until the instant invention, there has not been available a comparable technique for coating an extremely fine substrate with the requisite uniformity and consistency while at the same time being inexpensive and substantially maintenance free.

SUMMARY OF THE INVENTION

The present invention relates to a means for providing a filament, particularly boron, with a smooth, extremely uniform thin overcoat of a resin matrix material. The technique includes an improved process and apparatus whereby uniformly precoated fiber can be continuously produced with no deterioration of the desirable filament properties.

In accordance with one aspect of this invention a filamentary substrate of a suitable material, including such materials as boron, carbon and silicon carbide, is drawn through a pool of liquid resin consisting, in the case of boron, of such suitable resins as polyimide, epoxy-phenolic or epoxy-novolac resin. The resin is located immediately adjacent to a pool of liquid mercury so that the resin which adheres to the substrate by passage through the resin pool is wiped to a consistently uniform thickness by subsequent passage through the mercury pool. The use of liquid metal as a resin wiper results in an accurate control of the resin precoat while doing away with the requirement of delicate and often unreliable, expensive equipment. In contradistinction to conventional mechanical wiping brushes, rods and wheels which present interrupted lines of contact to the periphery of an advancing wire and which have a tendency to clog after a short period of operation, the present device provides several attractive and advantageous features. The wiping technique herein disclosed provides a continuous and uniform pressure contact area around the entire circumference of the moving filament, a smooth and virtually unwearing contact surface, a contact surface which is nonporous to, and hence will not absorb a resin, and an ability to run unattended for lengthy periods of time.

BRIEF DESCRIPTION OF THE DRAWINGS

An understanding of the invention will become more apparent to those skilled in the art by reference to the following detailed description when viewed in light of the accompanying drawings, wherein:

FIG. 1 is a side elevational view of the resin wiper and associated elements, and FIG. 2 is a detailed cross-sectional view of the resin wiper.

DESCRIPTION OF THE PREFERRED EMBODIMENTS

As seen in FIG. 1, the resin coating is produced on a substrate 10 which is drawn downwardly from a supply roll 12, through a resin pot 14 and a cure furnace 16 to pass over an idler roll 18 to a take-up spool 20. The substrate is drawn through the resin pot from the feed reel 12 to the take-up reel 20 which maintain the wire under a slight tension and in combination with the roll 18, center it in the resin pot. The substrate is a single filament such as the boron, carbon, silicon carbide or glass wire presently being used for fiber reinforcement of composite materials. As a general rule, these filaments have a diameter of approximately 4 mils and are moved longitudinally through the apparatus at speeds ranging from 800 to 16,000 ft./hr. The production of precoated filaments at such a speed level provides an efficient and economical means which is adapted to functional association with present filament-forming equipment to provide a continuous and direct precoated fiber-forming process. For instance, the rate of production of boron fibers in a boron reactor of the type disclosed in a copending application entitled Method for Producing Filamentary Boron and Apparatus Therefor, by Charles Rice, Ser. No. 618,511 is compatible and within the capabilities of the system disclosed herein.

The resin pot 14 is comprised of a tubular containment vessel 22 open at its upper end and closed off at its lower end by a metallic fitting or end plug 24. The plug is formed to provide a well 26 for containing a suitable sealant 28, such as mercury, which serves the dual purpose of providing a wiping seal around the wire where it penetrates the end plug, and further providing a non-reactive supporting surface for the liquid resin 30. Other liquid metals may be used providing they perform the above functions and have a temperature low enough so that they do not cause curing of the resin or ebullition of the solvent. Satisfactory results may also be obtained from such liquids as nickel-mercury amalgam, silver-mercury amalgam or other like materials. The plug is formed with a centrally-oriented orifice 32 which is large enough to accommodate the free passage of the wire therethrough but which, in combination with the wire, is small enough to retain the mercury, through surface tension forces, in the well. In order to provide increased life to the orifice and less substrate contamination in the process, the end plug is shown with a ruby insert 34 which actually defines the orifice 32 and which, in combination with the wire, provides the sealant retainment function previously mentioned. Of course, the insert can be formed of Teflon or other suitable material in order to further reduce apparatus cost and contamination.

It has been found that in the present mercury wipe system, the faster the filament travels, the thicker is the resulting resin coating. Unfortunately, when the thickness of resin applied exceeds .05 mil, the coating loses its smoothness and uniformity and becomes rough and rippled. To compensate for this undesirable characteristic, the resin is mixed with a solvent in order to adjust its viscosity. In this way, the tendency of the higher viscosity resins to pull mercury through the jewel 34 has been eliminated and the thickness of the coating applied in a single pass is optimized. A final coating thickness of .15 mil on the boron substrate has proven satisfactory and in order to achieve the same it has been found that a series of sequential resin pot-curing furnace combinations is most desirable. Of course the same end product can be achieved by running the fiber back through the same apparatus but for the sake of efficiency, the sequential series is preferred.

Although little mention has been made of the curing furnace 16, it is understood by those skilled in the art that this element is any suitable heating means which can attain the temperatures necessary to optimize the cure cycle of the particular resin used. In the drawings, the furnace is shown diagrammatically as being of the resistively heated type.

Various filaments were precoated with a number of different coating materials as may readily be seen from the following examples.

EXAMPLE I

In a resin pot-curing furnace of the type illustrated, a polyimide resin, commercially known as Skybond–703 from Monsanto Company, and liquid mercury were utilized. The resin has a 62% solid content and was diluted with T–8585 solvent from E. I. du Pont de Nemours and Co. Experiments showed that a mixture having a resin to solvent weight ratio in the range of 50 to 65% enabled boron fiber to receive a precoating of .05 mil thickness per pass at a speed of 4000 ft./hr. The resin was cured to an amber-brown color. Mixes with greater than 65% resin resulted in lumpy or rippled coatings and pulled mercury through the orifice 32. Mixes with less than 50% resin did not yield an acceptable coating thickness. After achieving a coating of .15 mil thickness, the fiber exhibited desirable handling characteristics and could be random or level spool-wound without snags, edge buildup or the necessity for paper between layers.

EXAMPLE II

Practical applications were conducted using liquid mercury and an epoxy-novolac resin formulation of the following proportions:

epoxy-novolac resin D.E.N. 438 (Dow Chemical Co.)—40 grams; polyamine curing agent Z (Shell Chemical Co.)—10 grams; solvent T–8585 (Du Pont)—60 grams.

Smooth and uniform coatings of approximately 0.5 mil thickness were obtained using the above mixture at substrate speeds of 800 ft./hr. and curing for 10 to 15 seconds at 350° C.

EXAMPLE III

Mercury and an epoxy-phenolic resin known as HT–424 from American Cyanamide Corporation was utilized in a mix with a 60 wt. percent resin to 40 wt. percent solvent ratio in the resin. Boron filament was successfully coated with a 0.5 mil thickness per pass at 4000 ft./hr. prior to curing for 10 to 15 seconds at 340° C. Of the two types of solvents used, acetone and T–8585, the better results were achieved with the latter.

Using the epoxy-phenolic resin above in a 70/30 ratio with solvent, the filament speed was increased to 16,000 ft./hr. with good results.

Although the foregoing description has been confined to the production of individual precoated filaments, it is to be understood that the process is amenable to other usages. For instance, the process is equally applicable to the production of multi-filament tape. It is only necessary that a plurality of precoated fibers be maintained in side-by-side coplanar relation as they are passed through the resin pot. Instead of a circular orifice 32, a rectangular orifice conforming to, but larger than, the cross-sectional area of the precoated filaments is provided. In this manner, the collimated precoated fibers are joined together and provided with a uniform overcoat which needs only to be cured to yield a finished tape. It can be seen then, that the instant invention yield not only a means for accurately precoating fibers so that they may be precisely collimated, but it also provides a means for uniformly overcoating a plurality of the precoated, collimated fibers into a finished tape product.

In all of the processes whereby the resin coating is provided, the particular technique utilized will be such as to produce the optimum coating as to quality and thickness. Further consideration will dictate that the process selected be characterized by good reproducibility and uniformity of result and not inconsistent with the rate of production of the basic fiber, although the latter requirement may not always be achievable. The coating parameters will naturally vary from material to material and various resins may be selected based on their ability to coat the substrate, their ease of handling, their stability at room and elevated temperatures, their compatibility with candidate matrix resins, and their bond strength to the substrate.

The particular thickness of the precoat applied in a given instance will be determined primarily by the usage to which the filament is to be put. Generally, a total thickness sufficient to provide a precoat comprising about 15 percent of the fiber in terms of cross-sectional area will be found advantageous.

In calculating the desired maximum thickness of coating, among the factors to be considered is the filament, the matrix volume ratio desired in the fiber-reinforced article, the maximum boron fill naturally yielding the higher strengths. Furthermore, while normally the material selected for the pre-coat will correspond to the matrix material utilized in the fiber-reinforced article, this is not a fundamental requirement. As long as the precoat material and the matrix material subsequently added are compatible both chemically and in terms of physical properties, the results in use will generally be satisfactory.

While for the sake of clarity and brevity, the foregoing description has been made with respect to specific examples, processes and parameters, these specific embodiments will be understood to be illustrative only, and no limitation is intended thereby. Various modifications and alternatives will be evident to those skilled in the art within the true spirit and scope of the invention as set forth in the appended claims.

I claim:

1. In a process for continuously depositing a smooth and uniform coating of resin on the surface of a filament as it moves through a resin pot having an upper and a lower end, the improvement which comprises passing the filament vertically downward from the upper to the lower end of the resin pot sequentially through a bath of liquid resin, through a bath of liquid metal which supports said liquid resin bath and has a density high enough to provide a wiping action on the resin coated filament, and through an orifice in said lower end which is large enough to allow free passage of the coated filament but which, in combination with the filament, is small enough to retain the liquid metal in said lower end.

2. The process as described in claim 1 wherein the liquid metal is mercury or an amalgam thereof.

3. The process as described in claim 2 wherein the liquid resin is a polyimide or an epoxy resin.

4. The process as described in claim 3 wherein the filament surface is of a material selected from the group consisting of boron, carbon and silicon carbide.

References Cited

UNITED STATES PATENTS

| | | | |
|---|---|---|---|
| 1,498,738 | 6/1924 | Lahousse | 117—102(L) |
| 1,595,239 | 8/1926 | Minton | 117—115X |
| 2,375,360 | 5/1945 | Herrick | 117—64 |
| 2,604,415 | 7/1952 | Whitfield et al. | 117—64 |
| 2,659,683 | 11/1953 | Mazee et al. | 117—115X |

FOREIGN PATENTS

| | | | |
|---|---|---|---|
| 85,924 | 8/1957 | Netherlands | 117—115 |

OTHER REFERENCES

Spain, R. G., et al. Graphite Fiber Reinforced Composites, in Advanced Fibrous Reinforced Composites, vol. 10, Society of Aerospace Material and Process Engineers p. A-21.

Materne, H. P., Jr., Silicon Carbide Filament Reinforced Epoxy Resin Composites, in Advanced Fibrous Reinforced Composites, vol. 10, Society of Aerospace Material and Process Engineers pp. A-31 and A-32.

ALFRED L. LEAVITT, Primary Examiner

J. R. BATTEN, Jr., Assistant Examiner

U.S. Cl. X.R.

117—102, 115, 161; 118—405, 506